(12) United States Patent
Matute

(10) Patent No.: US 11,706,212 B2
(45) Date of Patent: Jul. 18, 2023

(54) METHOD FOR SECURING ELECTRONIC TRANSACTIONS

(71) Applicant: Diego Matute, Kanata (CA)

(72) Inventor: Diego Matute, Kanata (CA)

(73) Assignee: Cyphercor Inc., Kanata (CA)

( * ) Notice: Subject to any disclaimer, the term of this patent is extended or adjusted under 35 U.S.C. 154(b) by 0 days.

(21) Appl. No.: 17/559,067

(22) Filed: Dec. 22, 2021

(65) Prior Publication Data

US 2022/0116386 A1    Apr. 14, 2022

Related U.S. Application Data

(63) Continuation of application No. 14/334,981, filed on Jul. 18, 2014, now abandoned.

(60) Provisional application No. 61/847,644, filed on Jul. 18, 2013.

(51) Int. Cl.
*H04L 9/40* (2022.01)
*H04W 12/06* (2021.01)
*H04W 12/069* (2021.01)

(52) U.S. Cl.
CPC .......... *H04L 63/0853* (2013.01); *H04L 63/18* (2013.01); *H04W 12/068* (2021.01); *H04W 12/069* (2021.01); *H04L 2463/082* (2013.01)

(58) Field of Classification Search
CPC ................. H04L 63/0853; H04L 63/18; H04L 2463/082; H04W 12/068; H04W 12/069
USPC ........................................................... 704/4
See application file for complete search history.

(56) References Cited

U.S. PATENT DOCUMENTS

2013/0227651 A1* 8/2013 Schultz .................. G06F 21/32
726/4

* cited by examiner

*Primary Examiner* — Thierry L Pham
(74) *Attorney, Agent, or Firm* — Aventum IP Law LLP

(57) ABSTRACT

A method for securing electronic transactions includes associating a mobile electronic device with a first user. A first computer system retrievably stores registration data relating to the first user, including a device identifier that is unique to the mobile electronic device. A security application that supports in-application push notifications is installed on the mobile electronic device. The first computer system sends a push notification to the mobile electronic device, the push notification prompting the first user to provide a confirmation reply via a user interface of the security application for activating the mobile electronic device as a security token. The mobile electronic device is activated as a security token for the first user in response to receiving at the first computer system, from the mobile electronic device, the confirmation reply from the first user.

28 Claims, 6 Drawing Sheets

METHOD FOR SECURING ELECTRONIC TRANSACTIONS

CROSS-REFERENCE TO RELATED APPLICATIONS

This application is a continuation of U.S. application Ser. No. 14/334,981 filed on Jul. 18, 2014, the entire content of which is incorporated herein by reference. U.S. application Ser. No. 14/334,981 claims the benefit of U.S. Provisional Application No. 61/847,644 filed on Jul. 18, 2013, the entire content of which is incorporated herein by reference.

FIELD OF THE INVENTION

The invention relates generally to a method for securing electronic transactions, and more particularly to a method for securing electronic transactions based on push notifications that prompt a user to confirm authentication via a mobile device.

BACKGROUND

Social networks, banking web sites, online merchants, Point-Of-Sale (POS) devices, Automated Teller Machines (ATMs) and many other secure systems require a user to provide authentication information prior to allowing the user to complete an electronic transaction. Some examples of electronic transactions requiring user authentication include making an on-line purchase using a credit card, moving funds or paying bills via a banking website, and accessing secure user data.

Over the years, electronic security has established that there are three commonly user identifiers. The first is a code or something the user knows that is preferably exclusively known by and secret to the user. However, over the years it has become commonplace to store one's passwords on the device for which they are intended or in a desk drawer. The second is a card or device. The device forms a token, which is required to access the system. Tokens are typically one of two types. A passive token is used when access is of a physical nature, when you go into a building you are provided with a nametag. Smartcards are also popular tokens for physical access. A smartcard is an active token that is provided to an individual and set up for that individual. For remote access, active tokens are used that are either event or time synchronized. The active tokens provide an access code each time a user tries to login and the access code is then provided to the server. Unfortunately, active tokens such as these are quite inconvenient when implemented securely. Third, there are actual qualities of the person being verified such as voice, fingerprints, retina scans, etc. for identifying individuals. These are often very unique and require no memory and, as such, are not likely stored or written down. That said, these qualities do not change and once compromised are of limited use. As such, these qualities alone are not well suited to identifying individuals.

Mobile systems are even more problematic. Physical access is not required and interception of data is very possible. Further, it is difficult to establish that the person trying to access the server is who they claim to be. For low security applications, this is a viable option, but as security becomes significant, issuing of tokens in person is more reliable.

In a typical mobile system the required authentication information is a username or access card number plus a password or Personal Identification Number (PIN). When typing authentication information into a website, often the username is in plain text form whereas the password is obfuscated from the view of others. This provides at least a modicum of secrecy and protects the user against unauthorized transactions in the event that his or her username is discovered. Similarly, a user could lose his or her bankcard or credit card and still have some protection against a criminal being able to complete an unauthorized electronic transaction, since the criminal must also possess the user's password or PIN. Of course, this security model fails in the event that the criminal acquires both the username/card number and password/PIN, for example finding the user's wallet in their desk drawer and their password written down.

A known approach for providing improved security in password access systems relies upon host authentication. For example, in banking a second from of ID is checked. In remote login, for example, a "callback" system has been proposed. In a callback system the computer that is being used to gain access to secured data or initiate a transaction is called back at a predetermined telephone number. Callback systems are capable of authenticating the location of a computer on the basis of previously provided information, making them suitable for dial-up networks but ineffective when the attack comes via the Internet. In U.S. Pat. No. 7,870,599, Pemmaraju discloses an out-of-band authentication system in which an access request to a host system is intercepted and transmitted to a security computer. The security computer looks up a number for the access-seeker's peripheral device and subsequently initiates communication with the peripheral device via an out-of-band authentication channel. After the access-seeker is authenticated, the security computer instructs the host computer to grant access to the access-seeker over a data access channel. Unfortunately the authentication process is performed entirely by the security computer, and therefore a hacker need only gain access to the security computer in order to compromise the system. Further, since the access-seeker's request is intercepted and redirected prior to the access-seeker being authenticated, it is possible that a hacker could intercept and redirect the request to a different system thereby obviating any improvements to the security process.

It would be beneficial to provide a method that overcomes at least some of the disadvantages of the prior art.

SUMMARY OF EMBODIMENTS OF THE INVENTION

In accordance with an aspect of the invention there is provided a method comprising: associating a mobile electronic device with a first user; retrievably storing, by a first computer system, registration data relating to the first user and including a device identifier that is unique to the mobile electronic device associated with the first user; installing on the mobile electronic device a security application that supports in-application push notifications; sending, by the first computer system, a push notification to the mobile electronic device, the push notification prompting the first user to provide a confirmation reply via a user interface of the security application for activating the mobile electronic device as a security token; and activating the mobile electronic device as a security token for the first user in response to receiving at the first computer system, from the mobile electronic device, the confirmation reply from the first user.

In accordance with an aspect of the invention there is provided a method comprising: registering by a first system a first user, comprising retrievably storing authentication data for use in authenticating the first user to the first system; registering by a second system the first user, comprising associating a uniquely identifiable mobile electronic device with the first user; requesting by the first user to the first system an electronic transaction requiring authentication of the first user by the first system; authenticating the first user by the first system based on the retrievably stored authentication data and based on data provide by the first user in response to an authentication challenge by the first system; subsequent to authenticating the first user, requesting by the first system to the second system a secondary authentication of the first user; sending from the second system to the uniquely identifiable mobile electronic device a push notification prompting the first user to provide a secondary authentication response via the uniquely identifiable mobile electronic device; receiving by the second system from the uniquely identifiable mobile electronic device the secondary authentication response provided by the first user; providing the secondary authentication of the first user from the second system to the first system based on the secondary authentication response; and subsequent to receiving the secondary authentication of the first user, performing by the first system the requested electronic transaction for the first user.

In accordance with an aspect of the invention there is provided a method comprising: associating a mobile electronic device with a first user; installing on the mobile electronic device a security application that supports in-application push notifications; registering, by a security computer, the mobile electronic device as a security token for use by the first user for authorizing electronic transactions; receiving at the security computer, from a first transaction system, a first request for authorization to complete a first electronic transaction; receiving at the security computer, from a second transaction system, a second request for authorization to complete a second electronic transaction; sending from the security computer to the mobile electronic device a first push notification prompting the first user to provide a first response authorizing the first electronic transaction; sending from the security computer to the mobile electronic device a second push notification prompting the first user to provide a second response authorizing the second electronic transaction; and providing from the security computer: a first authorization to the first transaction system in dependence upon receiving the first response from the first user authorizing the first electronic transaction; and a second authorization to the second transaction system in dependence upon receiving the second response from the first user authorizing the second electronic transaction.

In accordance with an aspect of the invention there is provided a method comprising: associating a mobile electronic device with a first user; installing on the mobile electronic device a security application that supports in-application push notifications; registering, by a first computer system, the mobile electronic device as a security token for use by the first user for authorizing electronic transactions; receiving an electronic transaction request from the first user, the electronic transaction request associated with a security level of a plurality of different security levels; transmitting via at least a push notification a request for N responses each including different authentication information, wherein the number N is greater than 1 and is determined based on the security level that is associated with the electronic transaction request; and in dependence upon receiving at the first computer system an expected response from the first user for each of the N responses, via the mobile electronic device, authorizing the electronic response by the first computer system.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
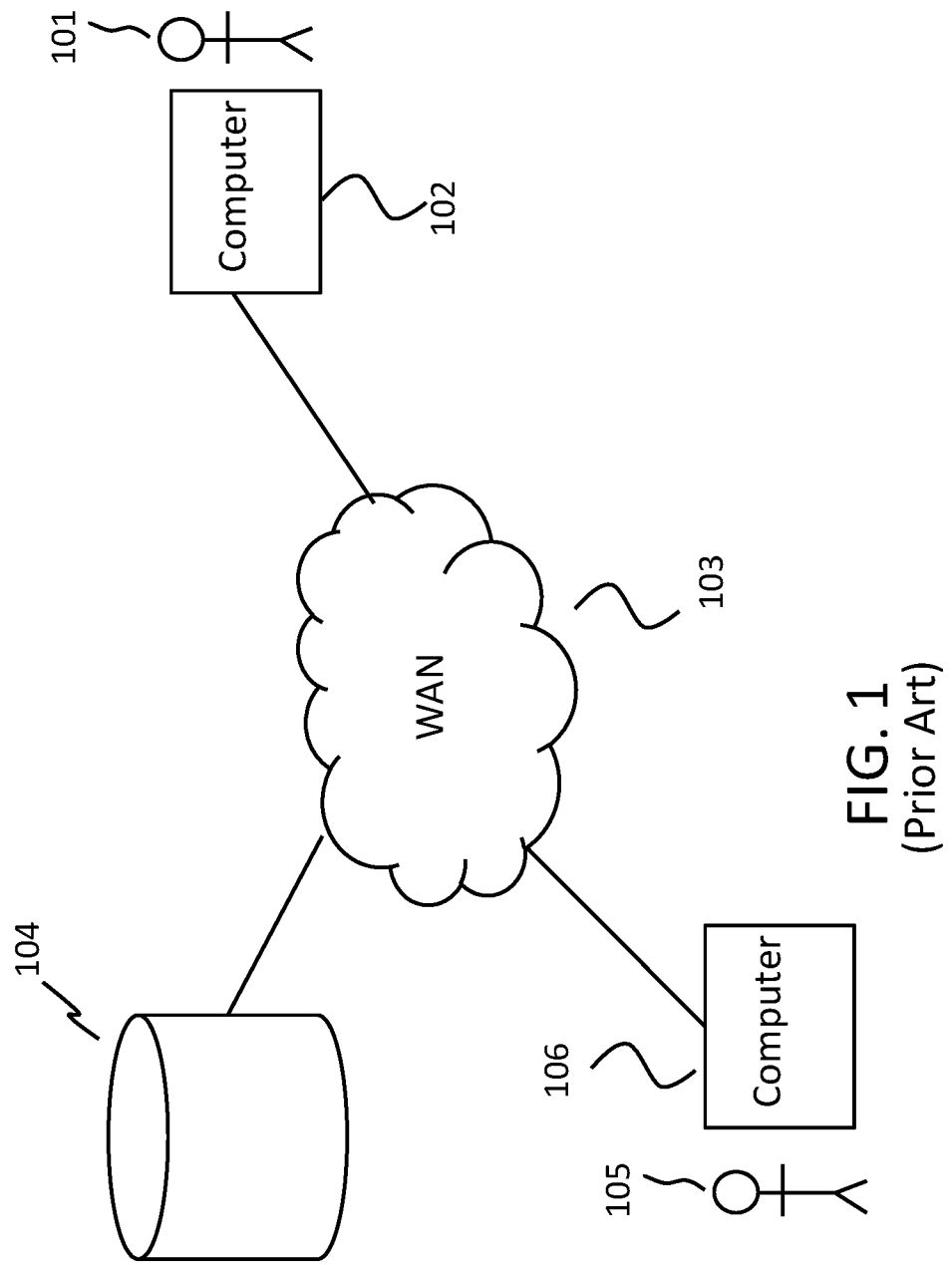
FIG. 1 is a simplified block diagram of a prior art system for securing an electronic transaction.

Referring to FIG. 1, shown is a simplified block diagram of a system for securing a transaction according to the prior art. In FIG. 1 the transaction being secured is the access to secure banking data. User 101 logs into a bank webpage by entering bankcard information in plain text into an unsecure bank webpage via computer 102. Next the user 101 enters a password, which is obfuscated—other than plain text. A request to access the user's 101 secure banking data is sent from computer 102 to bank server 104 via WAN 103. Bank server 104 verifies that the bankcard number and the password are correct, and transmits the secure banking data to computer 102 via the WAN 103. The bank has assumed that the person accessing the secure banking data of the user 101 is in fact user 101, based on the fact that the expected bankcard number and password were provided. In the scenario that is described in this example, the assumption is valid.

Still referring to FIG. 1, also shown is another user 105 who has improperly obtained the bankcard number and password that are associated with the user 101. User 105 logs into the same unsecure bank webpage as previously visited by user 101, and enters the improperly obtained bankcard information and password associated with user 101 via computer 106. A request to access bank data of user 101 is sent from computer 106 to bank server 104 via WAN 103. Bank server 104 verifies that the bankcard number and the password are correct, and transmits the secure banking data to computer 106 via the WAN 103. The bank has once again assumed that the person accessing the secure banking data of the user 101 is in fact the user 101 because the correct bankcard number and password were provided. However, in the scenario that is described in this example the assumption is incorrect, and the banking information of user 101 has been compromised.

Figure 2:
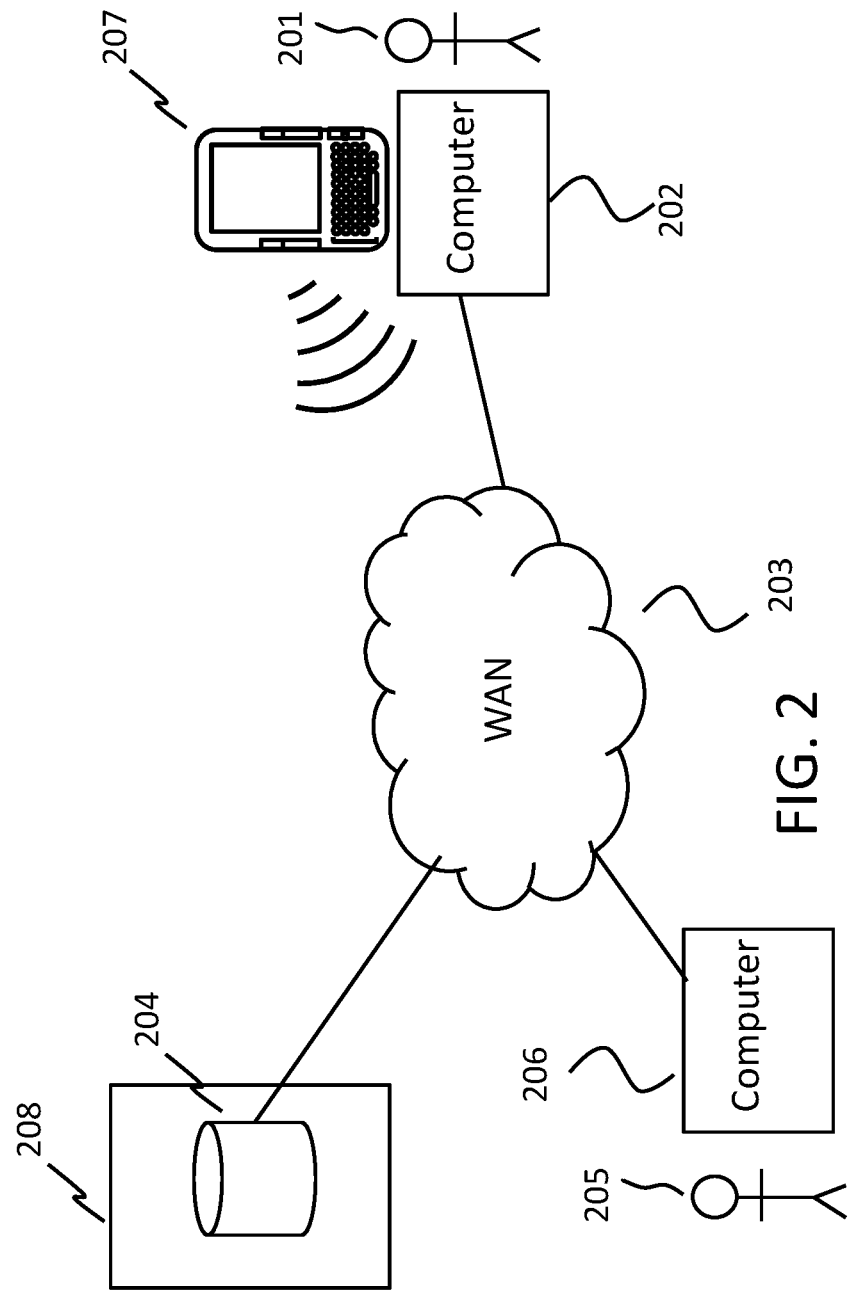
FIG. 2 is a simplified block diagram of a system for securing an electronic transaction.

Shown in FIG. 2 is a simplified diagram of a system for authenticating a user accessing secure data. User 201 downloads an application from bank 208 to smartphone 207 and registers smartphone 207 with the bank 208. The registration process creates a tokenized smartphone 207 wherein the smartphone and the intended owner of the smartphone are both uniquely known and verified. For example, the user goes to a branch of the bank 208 and is identified and has a code entered into their smartphone 207 by bank personnel to set up the token. Alternatively, the bank relies on the phone company to confirm that the person who has the phone is verified. Further alternatively, a third party verifies and tokenizes the smartphone 207 such that other service providers rely on that tokenization or alternatively tokenize the smartphone based on that token.

Now smartphone 207 is uniquely associated with user 201 and the application's security certificate is known to be uniquely associated with smartphone 207. User 201 logs into the bank 208 webpage by entering bank card information in plain text into an unsecure bank webpage via computer 202. Next user 201 enters a password, which is obfuscated—other than plain text. A request to access the user 201 bank data is sent from computer 202 to bank server 204 via WAN 203. Upon receiving the request, server 204 verifies the username and password combination. When the combination is correct, the server transmits or causes to be transmitted a push notification to the application executing on smartphone 207, via WAN 203, indicating that someone is attempting to access user 201 bank data. A response is expected for the transaction to continue. User 201 responds to the push notification acknowledging that user 201 is attempting to access the bank data. The reply is transmitted by smartphone 207 to bank server 204 via WAN 204 in a fashion that also verifies the certificate of the application stored within the smartphone 207. Bank server 204 verifies the bankcard information, password provided, the reply and that it is known to have been received from smartphone 207. There are two levels of security protecting the banking data of user 201, the password and the reply via the certificate based push notification process. Optionally, the password is not requested and only a response to the push notification is requested for user 201 to gain access to the user 201 bank data. Optionally, the push notification response is a password or some other authorization information. Alternatively, a server other than bank server 204 sends the push notification to the smartphone 207. In some embodiments, the smartphone receives a challenge from the server and responds by transforming the challenge in dependence upon one of the certificate and other tokenizing data to form the reply.

Referring still to FIG. 2, shown is user 205 who was crafty enough to attain the bank card number and password of user 201 through nefarious means. User 205 logs into the same unsecure bank webpage as previously visited by user 201 and enters user 201 bank card information and password via computer 206. A request to access the user 201 bank data is sent from computer 206 to bank server 204 via WAN 203. Upon receiving the request, server 204 sends a push notification to smartphone 207, via WAN 203, indicating that someone is attempting to access user 201 bank data. A response is expected via the smartphone 207 for the transaction to continue. Upon seeing the push notification, user 201 realizes that someone unauthorized is attempting to access user 201 bank data. User 201 does not respond to the push notification and instead contacts bank 208 to report the event and requests a new bank card. Meanwhile, user 205 is denied access to user 201 bank data. Alternatively, user 201 indicates in the response to the push notification that user 201 is not trying to access bank data, and that an unauthorized user is attempting to gain access to user 201 bank data. For user 205 to gain access to user 201 bank data user 205 must have user 201 bank card, password and smartphone 207. Alternatively, a server other than bank server 204 sends the push notification. Alternatively, the webpage is an online shopping webpage and smartphone 207 is registered with the online shopping store. In this example, should user 201 lose smartphone 207 user 201 would have to contact every business to which smartphone 207 is registered to prevent any transactions another user may attempt while in possession of smartphone 207.

Figure 3:
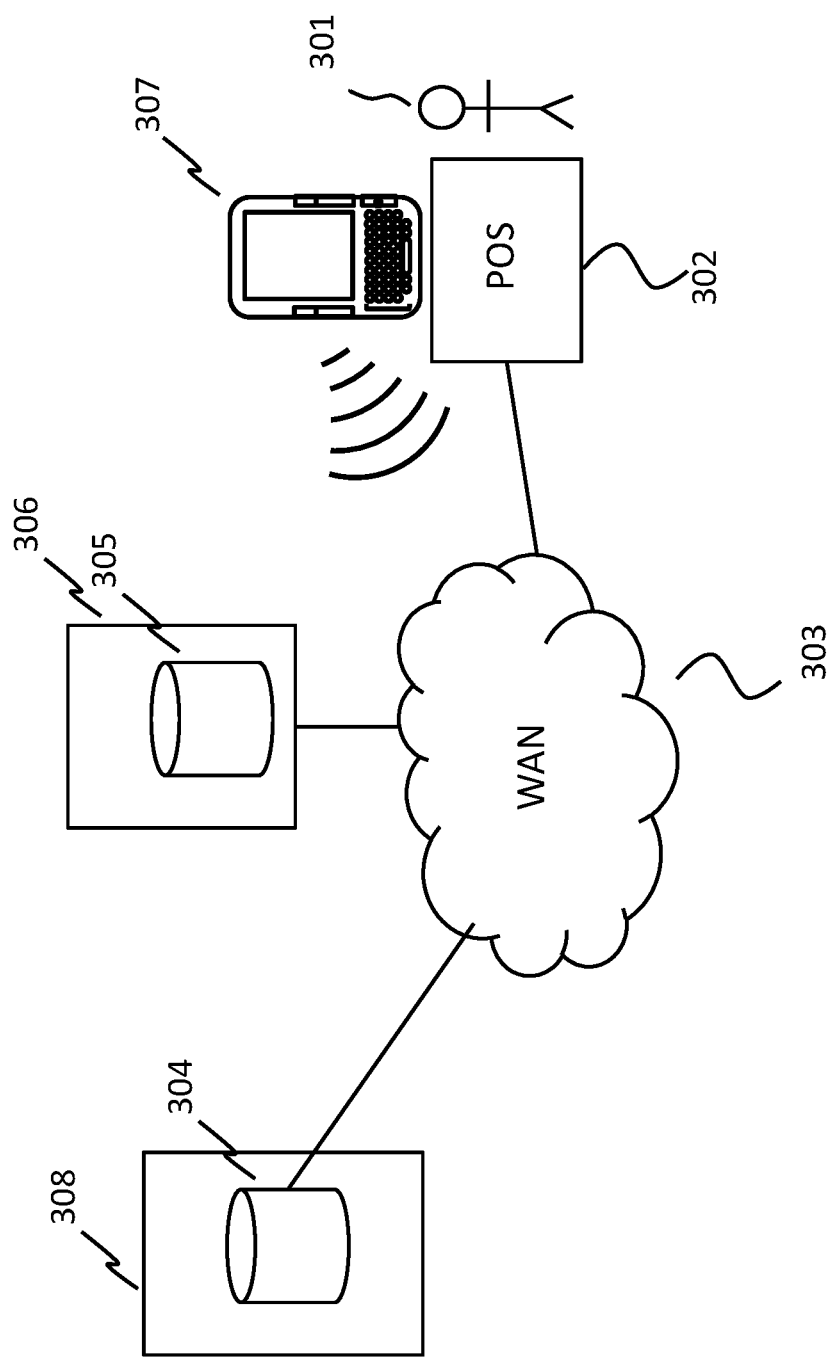
FIG. 3 is a simplified block diagram of another system for securing an electronic transaction.

Now referring to FIG. 3, shown is a simplified diagram of a system according to an embodiment. Security service 306 provides a security application for users of smartphones. When the security application is installed on a smartphone a unique certificate is associated with that application and hence with that smartphone. Other businesses make use of the security service 306 to authenticate a user attempting to access secured data. For example, user 301 has downloaded the security application from security service 306 and has registered smartphone 307 with security service 306. Now smartphone 307 is uniquely associated with user 301. User 301 is making a purchase at a retail store and is paying via the point-of-sale (POS) machine with a bank card. User 301 inserts the bank card into POS machine 302, and it prompted by the POS machine 302 to enter a password. After entering the password into the POS machine 302 a request is sent from the POS machine 302 to bank 308, server 304, via WAN 303 to complete the transaction. The bank server 304 communicates with security service 306 indicating that verification of the user attempting to access user 301 bank data is needed. A push notification is sent to smartphone 307 from server 305 via WAN 303, requesting a response. Smartphone 307 has been tokenized through a user verification and phone verification process ensuring that smartphone 307 belongs to the intended recipient. User 301 enters a response into smartphone 307, which is, along with the application certificate, transmitted to server 305. Server 305 verifies the user and transmits a message to bank 304 indicating verification of user 301. For example, the response includes a private confirmation code. Bank server 304 permits the payment transaction to continue. Alternatively, the business is an online shopping website, an ATM or a business other than a bank. In this example, should user 301 lose smartphone 307, user 301 would have to contact only one company, the security service 306, to prevent any transactions another user may attempt to perform while in possession of smartphone 307. The bank 308 would not have to keep a record of smartphone security certificates in this instance as the security service 306 provides that function.

Alternatively, a hybrid of the previous two embodiments is employed where some businesses rely on a security service and others perform the tokenization and secondary verification themselves. When several tokens are formed with a single smartphone 307, different levels of security and security information sharing are supported. For example, a military issued token is accepted everywhere whereas a store issued token is only accepted at that store. A bank issued token is accepted everywhere in relation to transactions involving that bank—transactions where money is being paid on behalf of the consumer from that bank. Thus, if a bank forms a token on a smartphone and associates that token with a credit card, paying with that credit card—drawn on that bank—is verifiable relying on the banks token and security process. In contrast, opting to trust another bank or a government service is based on known security steps in those processes or approval by an insurer of the transactions.

By tokenizing the smartphone 307, a bank or other institution is able to verify transactions therewith with a level of confidence. Similarly, when a credit card is drawn on a bank, tokenizing the smartphone allows a vendor to rely on that token in verifying a transaction knowing that it means that to that bank the smartphone is of the claimed individual. This allows tokens to be used even when neither of the parties to a transaction are the provider of the tokenization service.

Figure 4:
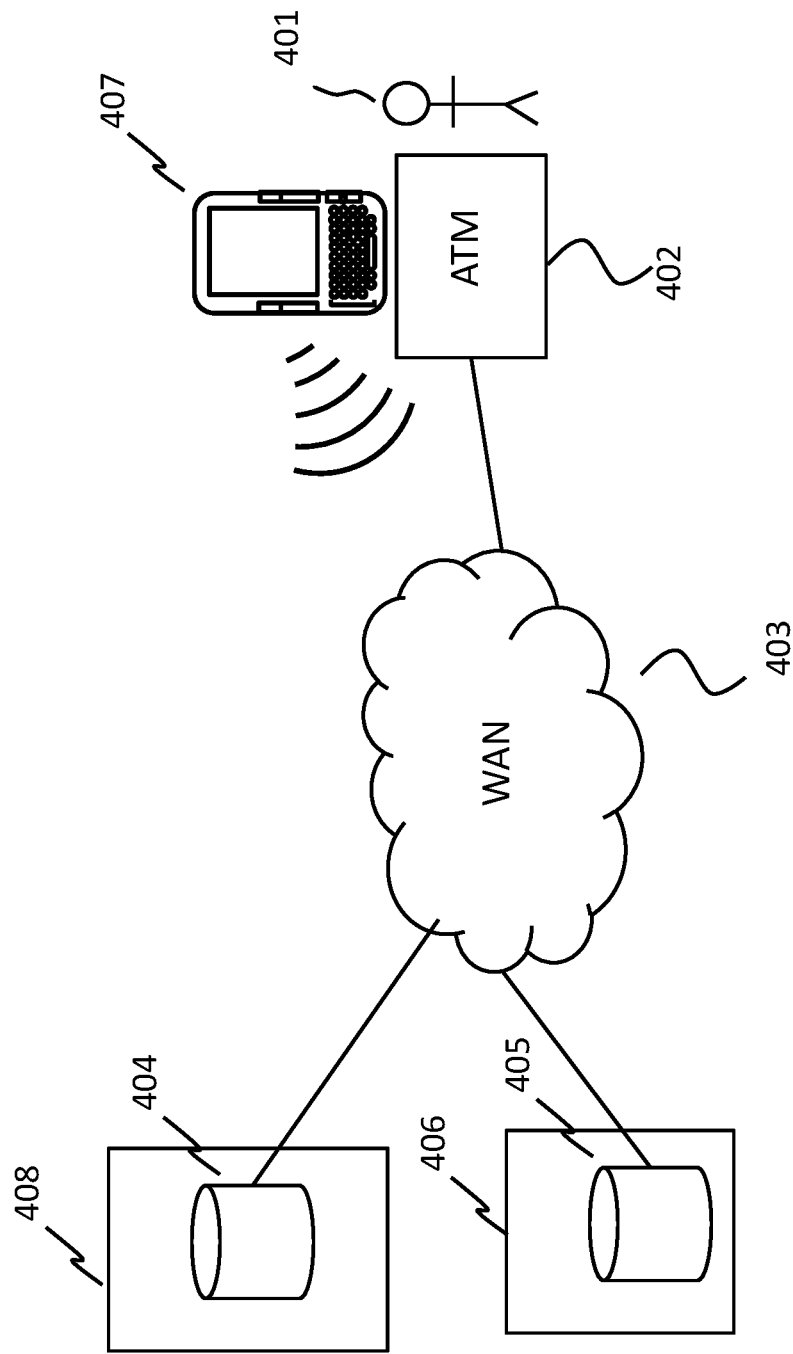
FIG. 4 is a simplified block diagram of another system for securing an electronic transaction.

Now referring to FIG. 4, shown is a simplified diagram of a system according to an embodiment. Security service 408 provides a service to users and businesses for authenticating a user attempting to access secure data. Security service 408 provides a security application to each business and maintains a list of smartphones and businesses that the smartphone is registered with. User 401 wishes to take funds out of a bank account via ATM 402. User 401 had previously downloaded bank 408 security application and registered smartphone 407 with bank 408 and security service 406 for forming a tokenized smartphone. Now smartphone 407 is uniquely associated with user 401. User 401 inserts the bank card into the ATM 402, and it prompted by the ATM 402 to enter a PIN (personal identification number). After entering the PIN into the ATM 402 a request is sent from the ATM 402 to bank 408, server 404, via WAN 403 to complete the transaction. A push notification is sent to smartphone 407 from server 404 via WAN 403, requesting a response. User 401 enters a response into smartphone 407 which, along with the certificate, is transmitted to server 404. Server 404 verifies the response and certificate and permits the withdrawal transaction to continue. Alternatively, a server other than bank server 404 sends the push notification. In this example, should user 401 lose smartphone 407, user 401 would have to contact only one company, the security service 406, to prevent any transactions another user may attempt to perform while in possession of smartphone 407. The security service would notify each of the businesses that smartphone 407 is registered with to prevent any transactions another user may attempt to perform while in possession of smartphone 407. Also, each business, in this case bank 408, would have control of it's own security process.

Alternatively, when several tokenizing authorities tokenize a same smartphone, each is contacted. Further alternatively, when several tokenizing authorities tokenize a same smartphone, each maintains a list of those who have tokenized the phone such that contacting one is sufficient to ensure that each is contacted. Yet further alternatively one security service maintains a list of those who have tokenized each smartphone and acts as a clearinghouse for ensuring that tokens are other than compromised.

As is evident to those of skill in the art, a remote device is difficult to tokenize without a prior existing token of greater or equal security as verification becomes an issue. Advantageously, by tokenizing the smartphone as described herein, a remote token that is tokenized by a party other than the two main parties to a transaction is supported. Further, token authorities outside of security departments of organizations for which the tokens are intended become functional and supported.

Figure 5:
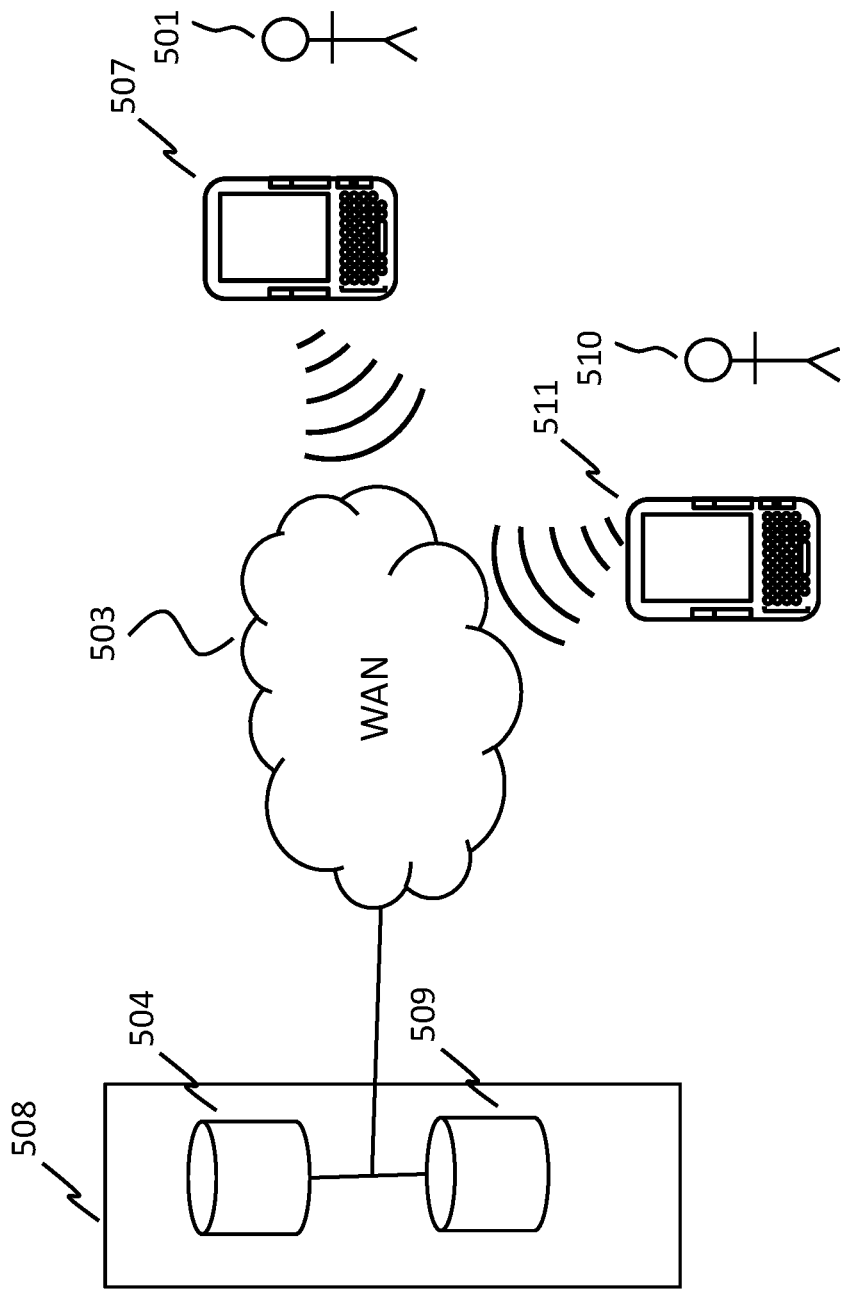
FIG. 5 is a simplified block diagram of another system for securing an electronic transaction.

Shown in FIG. 5, is a simplified system according to another embodiment. User 501 downloads an application from an online vendor 508 and registers smartphone 507 with the online vendor 508. Now the online vendor 508 uniquely associates smartphone 507 with user 501. To purchase an item from online vendor 508 user 501 enters a credit card number and associated billing information into a webpage on vendor 508 website. The request for a purchase is transmitted from smartphone 507 via WAN 503 to server 504 of online vendor 508. A push notification is sent from server 509 to smartphone 507 requesting verification of the application executing on smartphone 507, for example based on the smartphone 507 being a token and relying on a certificate or other secure mechanism. Here, the certificate is used to ensure that communication transmitted back to server 509 is from the token in the form of smartphone 507. Once server 509 verifies that the certificate relied upon is in fact from the smartphone 507 the transaction is permitted to continue. Alternatively, the credit card information is stored with online vendor 508 and user 501 other than inputs credit card information each time a purchase is made. Of course since the smartphone 507 is tokenized, it is known that the token is interacting during a security verification stage of the process and, as such, it is not merely a side channel or another way to reach the user.

Still referring to FIG. 5, shown is user 510 with smartphone 511. User 510 (the daughter of user 507) has attained user 501 credit card number and billing information and is attempting to make a purchase from online vendor 508 with the information. User 510 enters user 501 credit card number and associated billing information into the online vendor 508 webpage. The request for a purchase is transmitted from smartphone 511 via WAN 503 to server 504 of online vendor 508. A push notification is sent from server 509 to smartphone 511 requesting a certificate from an application that should be executing on smartphone 510. However the application certificate received by server 509 is other than the certificate from the application executing on smartphone 507—smartphone 510 is not a correct token—and the purchase request is denied. A message is sent to smartphone 507 indicating that another user has attempted to use user 501 credit card information and advises user 501 to cancel the credit card. Alternatively, the online vendor 508 uses a security service to provide authentication information.

Alternatively, user 510 has a spending limit wherein purchases below the limit are authorizable with the token of the user 510, whereas purchases above the spending limit result in the user 507 being notified on their tokenized device and having to authorize the transaction before it proceeds.

Alternatively, a push notification is sent from server 509 to smartphone 507 requesting a certified response from the application executing on smartphone 507. The application other than responds with a certified response to server 509 as smartphone 507 is other than attempting to purchase from the online vendor. Optionally, the application sends a message to user 501 indicating an unauthorized user has access to user 501 credit card information.

Figure 6:
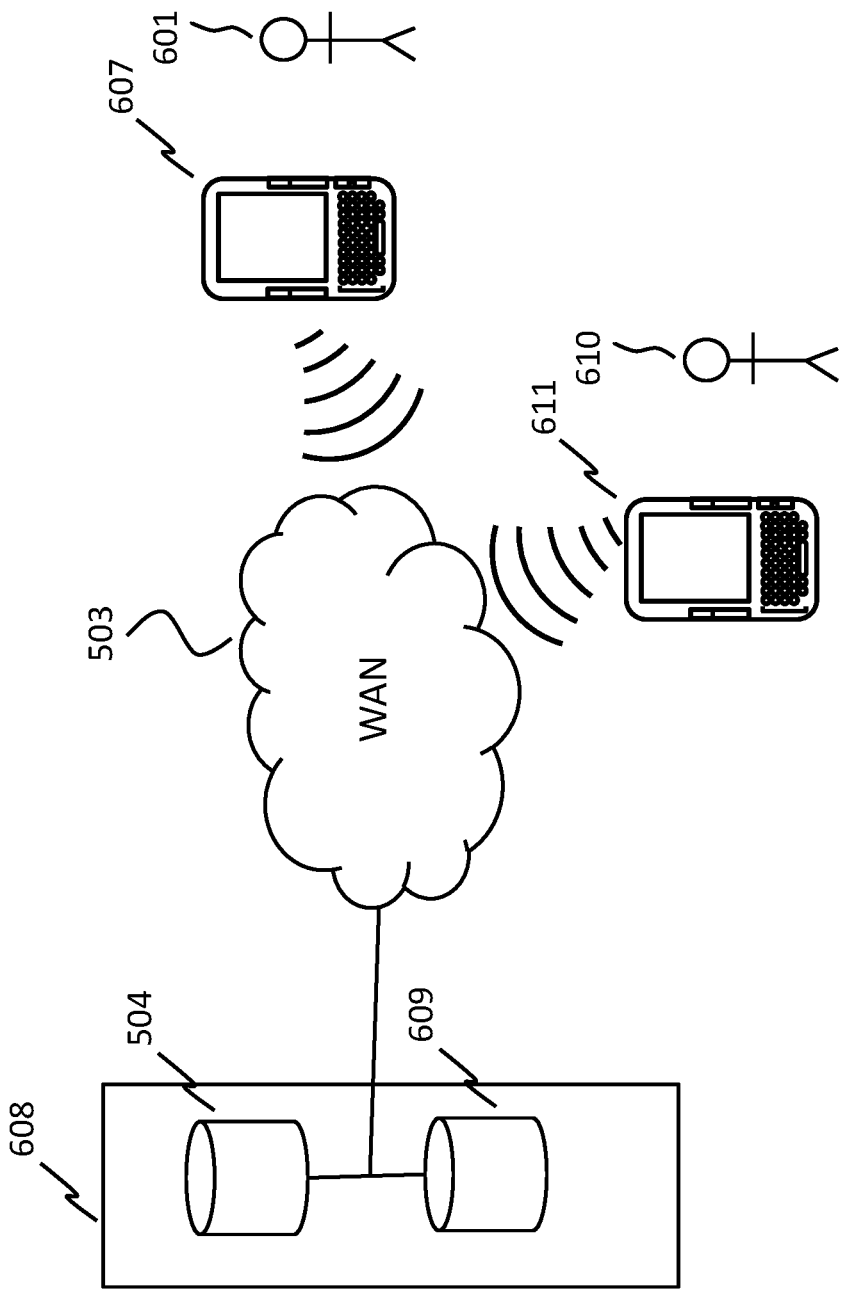
FIG. 6 is a simplified block diagram of another system for securing an electronic transaction.

Shown in FIG. 6, is a simplified system according to another embodiment. User 601 has registered smartphone 607 with online vendor 608. Smartphone 607 is tokenized—forms a token—for secure association with user 601. User 610 has made a copy of smartphone 607 and installed the copy on smartphone 611. User 610 has also gained access to user 601 credit card information. Attempting to purchase an item on vendor 608 website, user 610 inputs user 601 credit card information into a webpage. A push notification is to be transmitted from server 609 to smartphone 611. Although a copy has been made of smartphone 607 onto smartphone 611 and smartphone 611 has been authorized to a same mobile phone account as smartphone 607, smartphone 611 does not have smartphone 607 unique certificate—isn't the same token. Continuing the transaction is denied as smartphone 611 could not validate the security request by, for example, certifying a necessary response. Alternatively, a push notification is sent to smartphone 607 when in operation indicating the access attempt. User 601 responds indicating that user 601 is not accessing the online vendor 608 website. Further alternatively, smartphone 611 informs its user to tokenize the smartphone through whatever steps are required for doing so. For example, the user is told to go to the nearest bank branch with two forms of ID and the smartphone 611 in order to tokenize smartphone 611 and to be able to authorize the transaction.

Because of the prolific nature of bank branches, tokenizing of a smartphone is not as onerous as it would be if attendance at each specific vendor's place of business were required. This is further convenient when some vendors, such as Amazon® lack physical places of business. Alternatively a governmental authority issues tokens such as the driver's license office, the social security office, the passport office, etc. Yet further alternatively, tokenization is performed by the telephone company when they set up a smartphone.

Alternatively, once the device is tokenized, push notifications are provided to a process in execution on the device. Processes in execution include system processes and system functions such as a browser. Once tokenized, the device itself can support token verification functions allowing for use of other processes along with token verification to ensure device authorization and that the token is correctly associated and installed on a particular physical device.

In accordance with a very broad embodiment, a security token is formed from a smartphone allowing the smartphone to form a mobile security token for use in accessing data and services via the world wide web and other communication media.

Numerous other embodiments may be envisaged without departing from the scope of the invention.

What is claimed is:

1. A method comprising:
   associating a mobile electronic device with a first user;
   retrievably storing, by a first computer system, registration data relating to the first user and including a unique device identifier that is unique to the mobile electronic device associated with the first user and unique to an instance of a security application installed thereon;
   causing, by the first computer system, a first push notification to be transmitted to the mobile electronic device by requesting a push notification process in dependence upon the unique device identifier and for pushing notification content, the push notification process for transmitting the first push notification to the mobile electronic device associated with the unique device identifier, the first push notification when displayed on the mobile electronic device prompting the first user to provide a confirmation reply via a user interface of the mobile electronic device for activating the mobile electronic device as a security token; and
   activating the mobile electronic device as a security token for the first user and for an instance of the application installed on the mobile electronic device in response to receiving at the first computer system, from the mobile electronic device, data confirming the confirmation reply from the first user.

2. The method of claim 1 wherein retrievably storing the registration data includes retrievably storing first authentication data for use in authenticating the first user to the first computer system.

3. The method of claim 2 wherein the push notification is for prompting the first user to provide second authentication data forming at least some of the confirmation reply, and further comprising receiving from the mobile electronic device the second authentication data at the first computer system.

4. The method of claim 2 wherein the push notification is for prompting the first user to provide second authentication data including a biometric input and forming at least some of the confirmation reply, and further comprising receiving from the mobile electronic device the second authentication data at the first computer system.

5. The method of claim 3 wherein activating the mobile electronic device as a security token for the first user is performed in dependence upon a result of comparing the second authentication data to the first authentication data and comprises assigning the security token to one of a plurality of different security levels in dependence upon a result of comparing the second authentication data to the first authentication data.

6. The method of claim 1 wherein the mobile electronic device is a smartphone and wherein the unique device identifier comprises a digital security certificate associated with at least one of the mobile electronic device and an instance of the application installed thereon.

7. The method of claim 1 comprising:
   providing from the first user to a second computer system an electronic transaction request;
   transmitting by the second computer system, prior to completing a first electronic transaction based on the requested electronic transaction, as second authorization request comprising the unique device identifier associated with the instance of the application installed on the mobile electronic device from the second computer system to the first computer system;
   sending, by the first computer system, a second push notification to the mobile electronic device, the second push notification prompting the first user to provide a response for authorizing the electronic transaction request;
   receiving, from the mobile electronic device, the response at the first computer system;
   in dependence upon receiving and validating the response at the first computer system, providing to the second computer system an authorization message; and
   in response to receiving the authorization message at the second computer system, completing the first electronic transaction.

8. The method of claim 1 comprising:
   uniquely associating the security token with a specific authorized service, the service for being authenticated in reliance upon the security token.

9. The method of claim 1 wherein the mobile electronic device comprises a smart phone and wherein the security token comprises tokenization data uniquely associated with the smart phone and with an application installed thereon such that copying of the tokenization data for use with at least one of another smartphone and another application other than results in a valid token.

10. The method of claim 1 wherein activating the mobile electronic device as a security token comprises establishing at least one of token-based and certificate-based trust with the first computer system.

11. The method of claim 10 wherein the first computer system comprises a secure push notification server.

12. A method comprising:
   registering by a first system a first user, comprising retrievably storing authentication data for use in authenticating the first user to the first system;
   registering by a second system the first user, comprising associating a unique device identifier that is unique to both a mobile electronic device associated with the first user and a specific instance of a security application provided thereon;
requesting by the first user to the first system an electronic transaction requiring authentication of the first user by the first system;
identifying the first user by the first system based on the retrievably stored authentication data and based on data provide by the first user in response to an authentication challenge by the first system;
subsequent to identifying the first user, transmitting a request by the first system to the second system, the request including the unique device identifier and requesting a secondary authentication of the first user;
sending from the second system to the mobile electronic device having the specific instance of the security application provided thereon and associated with the unique device identifier, a push notification prompting the first user to provide a secondary authentication response via the mobile electronic device associated with the unique device identifier;
receiving by the second system from the mobile electronic device associated with the unique identifier the secondary authentication response provided by the first user; and
in dependence upon the secondary authentication of the first user received from the mobile electronic device associated with the unique identifier being authenticated; and
subsequent to receiving the secondary authentication of the first user, performing by the first system the requested electronic transaction for the first user.

13. The method of claim 12 wherein associating a mobile electronic device with the first user comprises providing a security application associated with one of a unique digital security certificate and a unique device identifier on said device.

14. The method of claim 12 wherein the secondary authentication response provided by the first user comprises at least one of a password and a username.

15. The method of claim 12 wherein the secondary authentication response provided by the first user comprises biometric data.

16. The method of claim 12 wherein associating a unique device identifier comprises establishing at least one of token-based and certificate-based trust with the second system.

17. The method of claim 16 wherein the second system comprises a secure push notification server.

18. A method comprising:
associating a mobile electronic device with a first user;
installing on the mobile electronic device a security application that supports in-application push notifications;
registering, by a security computer, the mobile electronic device as a security token for use by the first user for authorizing electronic transactions by associating a unique device identifier with the mobile electronic device, the unique device identifier comprising at least one of a digital security certificate and a device token, the unique device identifier uniquely associated with the instance of the security application on the mobile electronic device and with the mobile electronic device;
receiving at the security computer, from a first transaction system, a first request comprising the unique device identifier for authorization to complete a first electronic transaction;
receiving at the security computer, from a second other transaction system, a second request comprising the unique device identifier for authorization to complete a second electronic transaction;
sending from the security computer to the mobile electronic device a first push notification prompting the first user to provide a first response authorizing the first electronic transaction;
sending from the security computer to the mobile electronic device a second push notification prompting the first user to provide a second response authorizing the second electronic transaction; and
providing from the security computer:
a first authorization to the first transaction system in dependence upon receiving the first response from the first user authorizing the first electronic transaction; and
a second authorization to the second other transaction system in dependence upon receiving the second response from the first user authorizing the second electronic transaction.

19. The method of claim 18 wherein the first response from the first user comprises first authentication information required for a first security level, and the second response from the first user comprises second authentication information required for a second security level different than the first security level.

20. The method of claim 18 wherein the first transaction system is associated with a first entity and the second other transaction system is associated with a second entity different than the first entity.

21. The method of 18 wherein the first transaction system identifies the first user prior to the security computer providing the first authorization.

22. The method of claim 18 wherein the first transaction system relates to a first service and the second transaction system relates to a second different service.

23. The method of claim 18 wherein associating a unique device identifier comprises establishing at least one of token-based and certificate-based trust with the security computer.

24. The method of claim 23 wherein the security computer comprises a secure push notification server.

25. A method comprising:
associating a mobile electronic device with a first user;
installing on the mobile electronic device a security application that supports in-application push notifications;
registering, by a first computer system, the mobile electronic device as a security token for use by the first user for authorizing, by the security application, electronic transactions, registering comprising storing a unique device identifier associated with the instance of the security application installed on the mobile electronic device and with the mobile electronic device;
receiving an electronic transaction request from the first user, the electronic transaction request associated with a security level of a plurality of different security levels;
transmitting to the mobile electronic device associated with a unique device identifier provided for identifying a destination for transmitting a push notification via at least the push notification a request for N responses each including different authentication information, wherein the number N is greater than 1 and is determined based on the security level that is associated with the electronic transaction request; and in dependence upon receiving at the first computer system an expected response from the first user for each of the N responses, via the mobile electronic device, authorizing the electronic response by the first computer system.

26. The method of claim 25 wherein the different authentication information comprises multi-factor authentication information.

27. The method of claim 25 wherein registering comprises establishing at least one of token-based and certificate-based trust with the first computer system.

28. The method of claim 27 wherein the first computer system comprises a secure push notification server.

* * * * *